Nov. 25, 1958 R. BIRD 2,861,741

BINARY ADDER

Filed Nov. 17, 1953

INVENTOR
RAYMOND BIRD

BY Frederick L. Hays
ATTORNEY

United States Patent Office 2,861,741 Patented Nov. 25, 1958

2,861,741

BINARY ADDER

Raymond Bird, Letchworth, England, assignor to The British Tabulating Machine Company Limited, London, England, a British company Application November 17, 1953, Serial No. 392,690

Claims priority, application Great Britain October 8, 1953

7 Claims. (Cl. 235—61)

This invention relates to electronic calculating machines operating in the binary system.

The object of the invention is to enable several binary numbers to be added together, where each binary number is entered as a time coded pulse train, lowest denomination first, and the timing interlaced so that the pulses of the different values relating to the same denomination occur in succession.

According to the invention, apparatus is provided for adding a plurality of serial pulse trains, each train representing a binary value, the relative timing of the pulse trains being such that the pulses having the same denominational value occur successively, said apparatus comprising a first bi-stable storage device, a binary counting chain comprising a plurality of bi-stable storage devices connected in cascade, means for changing the state of said first storage device for each pulse of the pulse trains, means controlled by said first storage device for entering one into said counting chain each time said first storage device changes from a first setting to a second setting, sum read-out means controlled by said first storage device, means for shifting the setting of each said device of said counting chain to the device of said chain of the next lower significance and for shifting the setting of the device of said chain of least significance to the said first storage device, and means for rendering effective said sum read-out means and said shifting means after the entry of each denomination has been completed.

By "bi-stable storage device" is meant an electronic device having two stable states and adapted to be switched from one state to the other by electrical pulsing. One bi-stable device satisfying these conditions is the well-known Eccles-Jordan hard valve trigger circuit which it is preferred to employ.

The counting chain, which may also consist of Eccles-Jordan triggers coupled together, has a binary capacity equal to the total of possible carries in any denominational addition. Accordingly, these carry counting triggers can operate at a lesser repetition rate than the adder. Furthermore, the number of carry counting triggers required increases slowly in relation to increasing number of inputs. Thus, a four-stage carry counting chain makes possible the addition of sixteen input values. Subtraction may be effected by the addition of complements. An initial entry of an end around carry is made for each negative value and the representation of each "1" or "0" in the pulse train of each negative value is also reversed.

The invention will now be described, by way of example, with reference to the accompanying drawing.

The invention will be described with reference to a four input adder.

Figure 3:
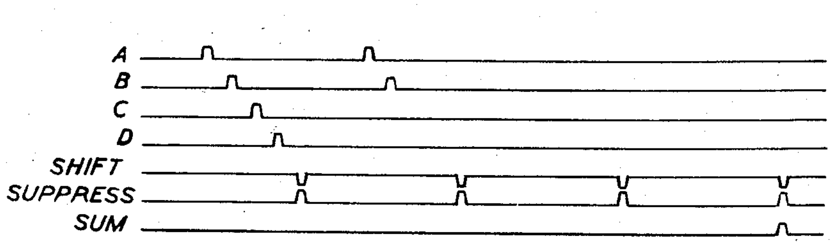
Figure 3 is a relative pulse timing diagram.

Assuming by way of example values, A, B, C, D expressed in binary notation are to be added. Positive pulses representing the "A" value are applied to the input line 20 and correspondingly B, C, D to lines 21, 22 and 23. Figure 3 shows the timing of the pulses for $A=11$, $B=11$, $C=1$, $D=1$ expressed in binary. It is seen that the values A, B, C, D are interlaced so that the possible "1" pulses in the lowest denomination of A, B, C, D each have their own timing and occur successively so that the common line 24 never receives more than one impulse at a time by way of input. The triggers 3, 8, 13 have two stable states of conductivity representing "0" or "1" respectively and are assumed to be initially in their "0" condition. The input pulses on line 24 as transmitted by amplifier 1 and gate 2 each effect the switching of the trigger 3. Every second input pulse causes the trigger 3 to deliver a positive carry pulse on line 27 to the carry counter. The carry counter comprises two binary stages in order to accommodate the maximum number of carries required to be stored during addition of one binary denomination. This thus takes into account any carries accumulated from previous additions. The carry pulses on line 27 are gated via amplifier 6 and gate 7 to set carry trigger 8. Every second carry pulse on line 27 produces a further like carry pulse on line 29 to set the next higher denomination carry trigger 13 via the amplifier 11 and the gate 12.

Upon completion of a denominational period of entry a negative shift pulse is applied to line 26 and a positive suppress pulse on line 17. The shift pulse reads out via gate 4 a pulse indicative of the then setting of the trigger 3 on line 25. This represents the sum term of the denomination. In like manner the shift pulse reads out the setting of trigger 8 via gate 9 to set trigger 3, and trigger 13 via gate 14 to set trigger 8, and via gate 16 a fixed zero setting to set trigger 13 to a zero indication. This has the effect of halving the carry count in the counter and entering the carry relating to the next higher denomination into the adder in preparation for entry of the next higher denomination of the input.

Where this shift operation has set triggers 3 or 8 from a "1" state to a "0" state a positive carry pulse would be generated on lines 27 or 29. These are prevented from reaching triggers 8 or 13 by a suppress pulse on line 17 which operates via gates 10 and 15 to inhibit gates 7 and 12. At this time there can be no genuine input pulses and any spurious pulses may likewise be inhibited from disturbing trigger 3 by applying the suppress pulse via gate 5 to gate 2.

In the example, the sequence of operations is:

| | Triggers | | |
|---|---|---|---|
| | 3 | 8 | 13 |
| 1st Denomination: | | | |
| Initial trigger settings | 0 | 0 | 0 |
| Entry—4 pulses A, B, C, D. | | | |
| Resultant trigger setting | 0 | 0 | 1 |
| Read out | 0 | | |
| Shift | 0 | 1 | 0 |
| 2nd Denomination: | | | |
| Initial trigger setting | 0 | 1 | 0 |
| Entry—2 pulses A, B. | | | |
| Resultant trigger setting | 0 | 0 | 1 |
| Read out | 0 | | |
| Shift | 0 | 1 | 0 |
| 3rd Denomination: | | | |
| Initial trigger settings | 0 | 1 | 0 |
| Entry—no pulses. | | | |
| Resultant trigger setting | 0 | 1 | 0 |
| Read out | 0 | | |
| Shift | 1 | 0 | 0 |
| 4th Denomination: | | | |
| Initial trigger setting | 1 | 0 | 0 |
| Entry—no pulses. | | | |
| Resultant trigger setting | 1 | 0 | 0 |
| Read out | 1 | | |
| Shift | 0 | 0 | 0 |

Hence binary values entered as 4 one-value pulses and 2 two-value pulses are read out as one 8-value pulse, i. e., 1000 in binary.

Thus, summarising, each pulse presented to trigger 3 reverses the state of trigger 3. Every second reversal causes a carry to reverse the state of trigger 8 and every second reversal of trigger 8 causes a reversal of trigger 13. After each complete denomination of entry values the setting of trigger 3 is read out and the settings of triggers 8 and 13 shifted down into triggers 3 and 8 respectively with the upward carry suppressed.

Figures 1, 2:
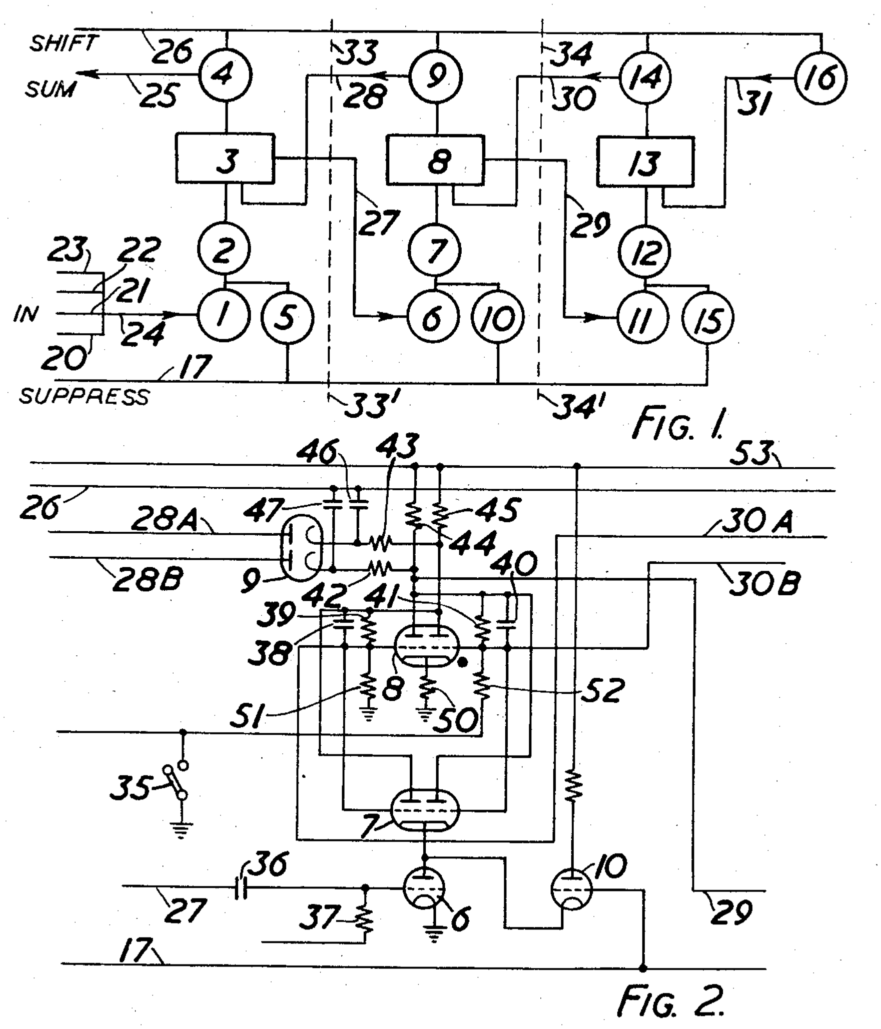
Figure 1 shows a block schematic of the adder and counter.
Figure 2 shows the block between lines 33, 33′ and 34, 34′ of Figure 1 as a detailed circuit.

Examination of the Figure 1 block diagram shows there are three similar sections to left of 33, 33′, between 33, 33′ and 34, 34′, and to right of 34, 34′.

By duplicating the middle section a greater number of inputs can be dealt with. Thus, an adder having four carry counting sections can deal with up to 16 binary values. Thus, where $x$ is the number of carry sections, two power $x$ inputs may be handled.

The amplifiers 1, 6 and 11 are similar and function in like manner and correspondingly, gates 2, 7 and 12, the suppress gates 5, 10 and 15, triggers 3, 8 and 13 and the read out gates 4, 9, 14 and 16. The slight variations will be dealt with under the particular type of circuit. Each section being so similar only the middle section of the block diagram is shown in Figure 2.

*Circuit*

*Amplifier 6*.—Amplifier 6 comprises a triode having its cathode connected to earth and its anode connected to the cathode of gate 7. Its grid is biassed via resistor 37 to just below cut-off. A negative pulse on line 27 applied via condenser 36 to the grid therefore produces no change of conductivity. A positive pulse causes valve 6 to conduct. Input line 24 differs from line 27 in receiving in common the input positive pulses.

*Gate 10*.—This is a triode having its cathode connected to the anode of valve 6, and its anode connected to the H. T. positive line 53. Its grid is normally at cut-off potential. If amplifier 6 were conducting, then on receipt of a large (50 volts) positive pulse (suppress pulse) on line 17 the cathode inhibits the fall of voltage at the anode of amplifier 6, thus suppressing the effects of any coincident positive pulse on the grid of amplifier 6.

*Gate 7*.—This is a twin triode with the cathode connected to the anode of amplifier 6 and the cathode of suppress gate 10. The anodes are each connected to the corresponding anodes of the trigger 8 and the grids are each connected to the opposite grids of the trigger 8. When the cathode is dropped in potential consequent upon a positive pulse on line 27 and the absence of a suppress pulse on line 17 that half of the twin triode having the more positive grid conducts first, so lowering the anode voltage of the non-conducting portion of trigger 8 by reason of the current drawn through resistor 44 or 45. The negative pulse at the cathode of valve 7 therefore changes the state of trigger 8 by anode triggering.

*Trigger 8*.—This comprises a twin triode having its common cathode connected to earth by resistor 50. The left hand anode is connected to the right hand grid by the resistor 41 with the condenser 40 in parallel therewith and the right hand anode and grid of gate 7 connected across the resistor 41. The right hand anode is connected to the left hand grid by the resistor 39 with the condenser 38 in parallel therewith with the left hand anode and grid of gate 7 also connected across the resistor 39. A potential divider network is formed by the resistors 45, 39, 51 between H. T. positive line 53 and earth. A like divider is formed by resistors 44, 41, 52, switch 35 between line 53 and earth. Initially switch 35 is opened to cause the right hand grid of twin triode 8 to rise in voltage so as to cause the right hand triode to conduct. This is the initial or "0" value setting. When one side of twin triode 8 is conducting the opposite side is nonconducting. A negative pulse applied to the anode of the non-conducting side by the change in conduction of gate triode 7 causes reversal of the state of conduction of the trigger 8.

Thus trigger 8 is set to initial "0" state by switch 35 and is reversed in state for each negative pulse applied to gate 7. During the halving process trigger 8 is set by lines 30 to the same state as trigger 13. Line 30B is connected to the right hand grid of the trigger 8 and 30A to the left hand grid of the trigger 8. Trigger 8 may therefore be set by a negative pulse on line 30A to a "0" state or by negative pulse on line 30B to a "1" state, irrespective of its previous state. Each time the trigger receives a negative voltage on the grid of the conducting triode it switches to the converse state. With the initial or "0" state being with the right hand triode conducting the left hand anode will be at high voltage. The switch from "0" to "1" will therefore cause a negative pulse to be applied to the grid of the amplifier 11 by line 29 and, as already stated, this is ineffective to enter a carry. Conversely, the switch from "1" to "0" will cause a positive pulse to be applied to the grid of amplifier 11 by line 29, so causing the amplifier 11 to conduct. The state of the trigger is read out or used to set a further trigger circuit by utilising the voltages at the anodes.

*Shift or read out gate 9*.—This comprises a double diode having one cathode connected by resistor 42 to the left hand anode of trigger 8 and the other cathode connected by resistor 43 to the right hand anode of trigger 8. The anodes are connected to the grids of trigger 3 by connections 28A and 28B. With both triggers in the same state the higher voltage grid of the trigger 3 is connected via diodes 9 to the higher voltage anode of the trigger 8 and correspondingly the lower voltage grid of the trigger to the lower voltage anode of the trigger 8. A negative shift pulse is then not sufficient to cause either diode to conduct, and so makes no change in the state of the trigger 3.

With the triggers in opposite states the higher voltage grid of trigger 3 is connected via one of the diodes 9 to the lower voltage anode of trigger 8 and a negative voltage applied to the shift line will cause this diode to conduct and lower the voltage of the grid of the conducting portion of trigger 3, so lowering the voltage of the higher voltage anode of trigger 3 and hence leading to a change of trigger state.

The trigger 13 being the highest value carry storage device, the read out diodes 16 are required to always set the trigger 13 upon receipt of a shift pulse to the "0" state. Trigger 13 has therefore only one line 31 corresponding to connection 30A and correspondingly only one diode in gate 16 is used. This diode has its cathode connected to a fixed potential corresponding to a lower voltage anode of a trigger and is also capacitatively coupled to the shift line 26. It is well known in the art that this diode shift circuit in conjunction with triggers has a limited storage "memory" facility, so that if a short shift pulse is applied, the original setting of a trigger is readout by the shift circuit, even though that trigger may be simultaneously receiving a switching impulse through a shift circuit controlled by another trigger.

What I claim is:

1. Apparatus for adding a plurality of binary serial pulse trains, the timing of the pulse trains being such that pulses having the same denominational value occur successively, which apparatus comprises a first bi-stable storage device, a binary counting chain comprising a plurality of bi-stable storage devices connected in cascade, means for changing the state of said first storage device for each pulse of the pulse trains, means controlled by said first storage device for entering one into said counting chain each time said first storage device changes from a first setting to a second setting, sum read-out means controlled by said first storage device, means for setting each device of said counting chain to the setting of the device of next higher significance and for setting said first storage device to the setting of the device of said chain of least significance, and means for rendering effective said sum read-out means and said setting means after the entry of the pulses of each denomination has been completed.

2. Apparatus for adding a plurality of binary serial pulse trains, the timing of the pulse trains being such that pulses having the same denominational values in different trains occur non-coincidentally, comprising at least three bi-stable storage devices connected together as a binary pulse counting chain, means for applying said pulse trains to the said device having least significance, sum-read-out means controlled by said device of least significance, means for setting each device to the setting of the device of next higher significance, and means for rendering effective said sum read-out means and said setting means after the entry of the pulses of each denomination has been completed.

3. Apparatus for adding a plurality of binary serial pulse trains, the pulses having the same denominational value occurring successively in the different pulse trains, comprising at least three bi-stable storage devices connected together as a binary pulse counting chain, means for applying said pulse trains to the said device having least significance, sum read-out means controlled by said device of least significance, means for setting each device to the setting of the device of next higher significance and for setting the device of highest significance to zero, means for suppressing entry into and counting operation of said chain, and means for rendering effective simultaneously said setting means and said suppressing means after the entry of the pulses of each denomination has been completed.

4. Apparatus for adding a plurality of binary serial pulse trains, the pulses having the same denominational value occurring successively in the different pulse trains comprising at least three bi-stable storage devices connected together as a binary pulse counting chain, means for applying said pulse trains to the said device having least significance, sum read-out means rendered effective by a read-out pulse for reading out the stored value of said device of least significance, means also controlled by said read-out pulse for setting each said device to the setting of the device of next higher significance and for setting the device of highest significance to zero, means for suppressing entry into the counting operation of said chain, and means for rendering effective simultaneously said setting means and said suppressing means after the entry of the pulses of each denomination has been completed.

5. Apparatus for adding a plurality of binary serial trains of pulses, the pulses having the same denominational value in the different trains occurring successively, comprising at least three electronic trigger circuits connected together in cascade as a binary pulse counting chain, each said circuit including two discharge devices having plates and grids; means for applying said pulse trains to the said circuit having lowest significance; a shifting circuit connected between each said trigger circuit and the said trigger circuit of next lower significance, said shifting circuit comprising a pair of diodes having their cathodes connected to the plates of said trigger circuit and their plates connected to the two grids of said trigger circuit of next lower significance; sum read-out means for reading out the value stored in said trigger circuit of least significance; and means for applying a negative shift pulse to the cathodes of each said shifting circuit and for rendering effective said read-out means after the entry of the pulses of each denomination has been completed.

6. Apparatus for adding a plurality of binary serial trains of pulses, the pulses having the same denominational value in the different trains occurring successively, comprising at least three electronic trigger circuits connected together in cascade as a binary pulse counting chain, each said circuit including two discharge devices having plates and grids; a plurality of shifting circuits connected between said trigger circuits, each said shifting circuit comprising a pair of diodes having their cathodes connected to the plates of one said trigger circuit and their plates connected to the grids of said trigger circuit of next lower significance; means for reading out the stored value of said trigger circuit of least significance; means for suppressing entry into and counting operation of said chain; and means for applying a negative shift pulse to the cathodes of each said shifting circuit and for rendering effective said read-out means and said suppressing means after the entry of the pulses of each denomination has been completed.

7. Apparatus for adding a plurality of binary serial trains of pulses, the pulses having the same denominational value in the different trains occurring successively, comprising at least three electronic trigger circuits connected in cascade as a binary pulse counting chain, each said circuit including a first discharge device and a second discharge device each having plates and grids; triggering means for each said trigger circuit comprising a first discharge device having a plate connected to the plate of the first discharge device of the trigger circuit and a grid connected to the grid of the second discharge device of the trigger circuit, and a second discharge device having a plate connected to the plate of the second discharge device of the trigger circuit and a grid connected to the grid of the first discharge device of the trigger circuit, a third discharge device having its plate connected to the cathodes of each pair of discharge devices, a fourth discharge device having its cathode connected to the plate of said third discharge device; means for applying the said pulses to a control electrode of said third discharge device; means for applying the carry pulses from each said trigger circuit to a control electrode of said third discharge device of the triggering means of the trigger circuit of next higher significance; a plurality of shifting circuits connected between said trigger circuits, each said shifting circuit comprising a pair of diodes having their cathodes connected to the plates of one said trigger circuit and their plates connected to the grids of said trigger circuit of next lower significance, a read-out circuit comprising a pair of diodes having their cathodes connected to the plates of the trigger circuit of least significance; means for applying a negative pulse to the cathodes of the diodes of each said shifting circuit and to the cathodes of the diodes of said read-out circuit; and means for applying a voltage to a control electrode of said fourth discharge device of each said triggering means to suppress entry into and counting operation of said chain, said last two mentioned means being effective after the entry of the pulses of each denomination has been completed.

References Cited in the file of this patent

FOREIGN PATENTS

| | | |
|---|---|---|
| 1,023,418 | France | Dec. 30, 1952 |
| 1,030,471 | France | Mar. 11, 1953 |
| 1,042,827 | France | June 10, 1953 |
| 1,044,678 | France | June 24, 1953 |